United States Patent [19]

Simmons

[11] Patent Number: 4,516,904
[45] Date of Patent: May 14, 1985

[54] EJECTOR WAGON

[76] Inventor: Lovel R. Simmons, P.O. Box 199, Flora, Miss. 39071

[21] Appl. No.: 611,935

[22] Filed: May 21, 1984

Related U.S. Application Data

[63] Continuation of Ser. No. 318,620, Nov. 5, 1981, abandoned.

[51] Int. Cl.³ .............................................. B60P 1/00
[52] U.S. Cl. .............................. 414/517; 298/23 MD; 414/519
[58] Field of Search ................. 298/23 MD; 414/509, 414/517, 519, 520

[56] References Cited

U.S. PATENT DOCUMENTS

| | | | |
|---|---|---|---|
| 3,352,439 | 11/1967 | Hardwick | 414/517 X |
| 3,768,672 | 10/1973 | Grooss | 414/517 |
| 3,941,260 | 3/1976 | Fisher et al. | 414/517 |
| 3,977,718 | 8/1976 | Nordberg | 298/23 MD X |
| 4,083,469 | 4/1978 | Schexnayder | 414/509 |
| 4,260,317 | 4/1981 | Martin et al. | 414/517 |

Primary Examiner—Leslie J. Paperner
Assistant Examiner—Janice Krizek
Attorney, Agent, or Firm—Trexler, Bushnell & Wolters, Ltd.

[57] ABSTRACT

A wagon for hauling earth, ore, and like materials is connected to a tractor by a gooseneck. The front wall of the wagon comprises an ejector and hydraulic cylinder-piston devices are secured substantially centrally of the wall and to the gooseneck for effecting ejection. A power-operated tail gate at the rear of the wagon secures an overlying mud gate in closed position for travel.

7 Claims, 7 Drawing Figures

EJECTOR WAGON

CROSS REFERENCE TO RELATED APPLICATION

This application is a continuation of application Ser. No. 318,620, filed Nov. 5, 1981, now abandoned.

BACKGROUND OF THE INVENTION

Wagons for carrying earth, ore, rubble, and other excavated material are well-known. It is also known to connect such a wagon to a tractor by means of a gooseneck affixed to the wagon and pivotally mounted on the tractor for pivoting about a vertical axis, with the gooseneck affording clearance above the rear wheels of the tractor. Various external means may be used for loading the wagon, and the wagon generally includes some means for moving the load from the wagon. The bodies of some wagons are arranged to be tipped up simply to dump the load carried thereby, whereas other wagons have positive ejecting means.

Such ejecting means may include a wall or plate of generally vertical disposition which is movable horizontally to eject the load from the wagon. Tremendous amounts of power are needed to move an ejector of this nature, as the load must be moved bodily across the floor of the wagon for dumping. It is known to use hydraulic cylinders for this purpose, but the ejector must be moved many feet, and this leads to extended cylinder-piston arrangements which are many feet long, and which in the past have been susceptible to damage, such as by a front end loader when loading the wagon. Such cylinder arrangements also are quite vulnerable to damage when the tractor-wagon unit must be maneuvered close to rock walls.

Problems also have been encountered with bending movements produced by the cylinders and the reaction of the load tending to pivot the ejector plate or wall about the movable mounts or guides therefore.

It is necessary to provide a movable closure opposite to the ejector wall so that materials can be retained for transport and then can be ejected from the wagon. Prior art closures for such ejection openings have therefore not been entirely satisfactory.

Relevant patent art on prior ejector wagons of the type heretofore discussed includes T. L. R. Hardwick U.S. Pat. Nos. 3,352,439 and 3,941,260.

OBJECTS AND SUMMARY OF THE INVENTION

The principal object of the present invention is to provide an improved ejector wagon.

It is a further object of the present invention to provide an ejector wagon in which the ejector cylinders are disposed in a protected area.

It is yet a further object of the present invention to provide an ejector wagon in which the ejector wall is configured and has ejection cylinder means attached thereto in such manner as to minimize bending forces on the travelling guide or mount for the ejector.

A further object of the present invention is to provide an improved back closure for the wagon opposite to the ejector wall.

In achieving the foregoing and other objects and advantages an ejector wagon is provided with hydraulic pistoncylinder means mounted in or on the gooseneck and connected to a pusher or ejector front wall of the wagon with the piston-hydraulic cylinder means thus being in a relatively non-vulnerable position.

The sidewalls of the wagon diverge upwardly and outwardly, providing a favorable carrying capacity to overall size and strength, and permitting heaping of material above the top of the wagon. Accordingly, the front pusher wall is larger at the top than at the bottom, and extends above the top of the sidewalls. The hydraulic piston-cylinder means is connected to the front pusher wall in such position as to minimize or eliminate turning force about the track and rollers mounting the pusher wall.

At the rear of the wagon there is a two-piece closure opening. An upper mud gate is pivoted at its upper edge for upward pivoting about a horizontal axis transverse of the wagon. At the lower edge a tailgate is pivoted about a transverse horizontal axis, and is hydraulically operated between open and closed position, and is provided with a hook at its upper edge for holding the mud gate closed.

THE DRAWINGS

The invention will thus be understood with reference to the following detailed description when taken in connection with the accompanying drawings wherein.

DETAILED DESCRIPTION

Figure 1:
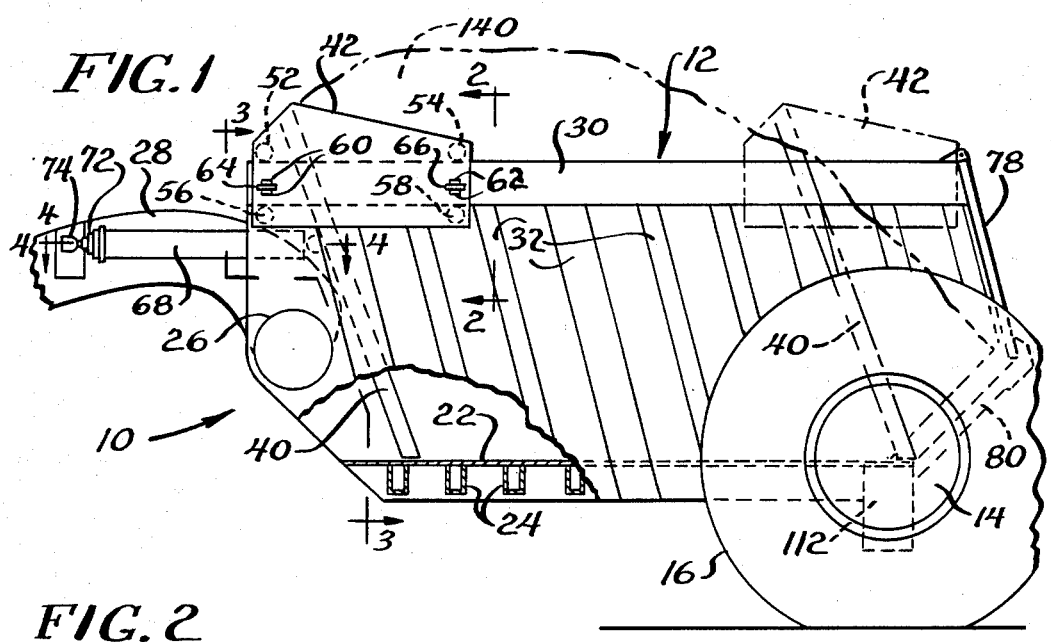
FIG. 1 is a side view of a wagon constructed in accordance with the principals of the present invention.
Figure 3:
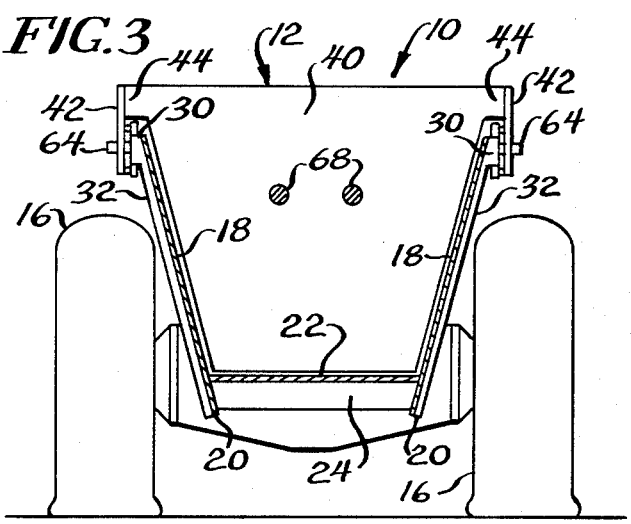
FIG. 3 is a front view of the wagon taken partly in section along the line 3—3 in FIG. 1.

Reference first should be made to FIGS. 1 and 3 wherein there is shown a wagon 10 constructed in accordance with the principals of the present invention. The wagon includes a body 12 having at the rear thereof a pair of wheels 14 having pneumatic tires 16 thereon. The wagon includes a pair of sidewalls 18 diverging upwardly from their lower edges 20. A fixed floor 22 extends between the sidewalls 18 from somewhat above their lower edges 20, there being crossbeams or channels 24 secured to the sidewalls as by welding and supporting the floor 22. The floor preferably is welded to the cross-beams 24 for enchanced rigidity.

A tubular cross-beam 26 extends between the sidewalls 18 at the front end thereof and slightly below the horizontal midline, and is secured thereto by suitable means such as welding. A gooseneck 28 is fixed to the tubular cross-beam, again as by welding, and extends forwardly of the wagon for attachment to a tractor by means well-known in the art, and not shown herein.

The sidewalls are provided along their upper edges with rails or box-like channels 30 running from front to back thereof. Reinforcing beams 32 of box-like configuration are welded to the sidewalls and lean slightly forwardly from bottom to top from a vertical position.

The beams at their upper ends are welded to the undersides of the channels 30.

Figure 2:
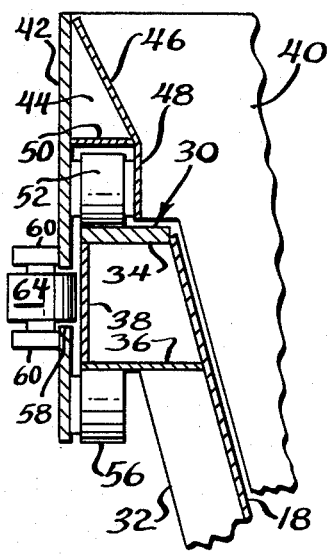
FIG. 2 is an enlarged fragmentary cross-sectional view taken substantially along the line 2—2 in FIG. 1.

Each channel as best may be seen in FIG. 2 includes a relatively fixed top plate or wall 34, a thinner bottom plate or wall 36 parallel thereto, and an outer vertical plate 38, all welded or otherwise suitably secured in fixed position along the upper edges of the walls 18.

A front end wall 40 serves as a pusher plate or ejector and conforms to the cross-sectional shape of the wagon body, and extends somewhat thereabove. The front end walls leans somewhat forwardly from the vertical, at a slightly greater angle than the reinforcements 32. This affords greater carrying capacity than a vertical wall, and tends to lift sticky material from the floor. As may be seen in FIG. 3 the front end wall 40 does not quite contact the inner surfaces of the floor 22 and of the sidewalls 18, although the gap is very small. The wall is mounted from the side rails or channels 30 by means best seen in FIGS. 1 and 2. Side plates 42 are mounted at the upper ends of the front wall 40 on upwardly and laterally extending portions 44. Bracing is provided by angularly disposed plates 46 having vertical depending lower margins 48, with intermediate horizontal plates 50. A roller 52 is disposed between the plate 42 and the depending flange or plate extension 48 and rides on top of the plate or wall 34. A roller 52 (FIG. 1) is at the forward end of the plate 42, and a similar roller 54 is disposed at the rear end of the plate on a horizontal level with the roller 52, and also rollable on the plate or wall 34.

Similar rollers 56 and 58 are disposed at the lower corners at the plate 42 and bear against the undersurface of the wall or plate 36. Intermediate the top and bottom of the plates 42 and of the rails or channels 30 there are apertures 58 (FIG. 2) in the plates 42 with laterally extending pairs of lugs or ears 60 and 62 respectively mounting rollers 64 and 66 which extend through the aperture 58 into proximity with the vertical plates 38. Whether or not the rollers 64 actually engage the plates 38 is not of the utmost importance, since the rollers 64 and 68 are provided for positioning only, with the major support of the plates 42, and hence of the end wall 40 being provided by the rollers 52, 54, 56 and 58. Only one of these plates 42 and pertinent structures has been specifically shown and described, but it will be understood that there are two such plates and pertinent structures in mirror image relationship carrying the front wall 40 from the opposite tracks or channels 30.

Figure 4:
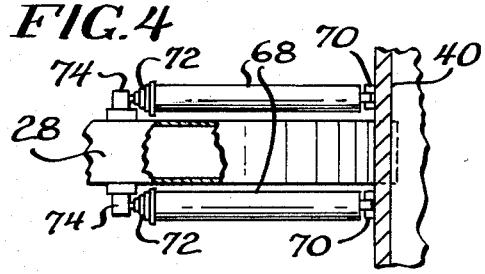
FIG. 4 is a fragmentary top view as taken along the line 4—4 in FIG. 1.

Means is provided for moving the front or ejection wall 40 from the solid line position shown at the front of the wagon in FIG. 1 to the broken line position shown at the rear of the wagon for dumping material therefrom. Such means comprises a pair of hydraulic cylinders 68 (FIGS. 1 and 4) mounted on the front of the wall 40 by suitable means such as pairs of ears and pins 70. The cylinders are provided with a plurality of telescoping pistons 72 suitably mounted on opposite sides of the gooseneck 28 by suitable mounts 74. As will be seen the cylinders 68 and pistons 72 lie on immediately opposite sides of the gooseneck and are thus in a relatively inaccessible position where they are protected against accidental damage. Suitable hydraulic lines are connected to the cylinders (not shown) from a source of hydraulic fluid under pressure on the tractor (not shown) and controlled by suitable controls on the tractor (not shown).

Figure 4A:
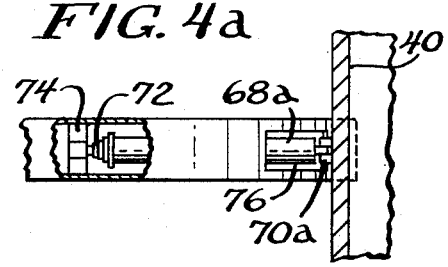
FIG. 4a is a view similar to FIG. 4 showing a modification of the invention.

An alternative construction is shown in FIG. 4a in which similar parts are identified by similar numerals with addition of the suffix a. This structure includes a single cylinder 68a mounted partially inside of the gooseneck and extending therefrom through a suitable aperture 76. The connection to the wall 40 by the structure 70a is along the vertical midline of the wall. The cylinder construction is thus even better protected against accidental damage.

It will be seen that the force exerted by the cylinder or cylinders 68 on the front wall or ejector plate 40 is symmetrical about the vertical center line of this wall. Thus, assuming a generally equal distribution of material in the wagon, there will be little or no tendency to rotate the ejector plate wall about its vertical axis.

As may be seen in FIGS. 1 and 3 the force exerted by the cylinders 68 is somewhat above the horizontal line of the wall 40. However, the wall is of lesser transverse dimension below the cylinders 68 than it is above. Furthermore, material is generally piled up above the top of the wall 40, and force necessary to eject the overlying material is exerted by the upper portion of the wall. Thus, forces encountered and exerted by the wall are approximately the same above and below the cylinders. As a result the force exerted by the cylinders is applied near the center of area or load and tends to move the wall straight back in its normal inclined position. This avoids any significant turning force about the plate 42 that would press the rollers more tightly against the rail 38, thus tending to cause some binding on the rail and a further pivot moment about the plate and rail, bearing in mind that in actual field conditions the rollers may not roll with their normal design efficiency.

Figure 5:
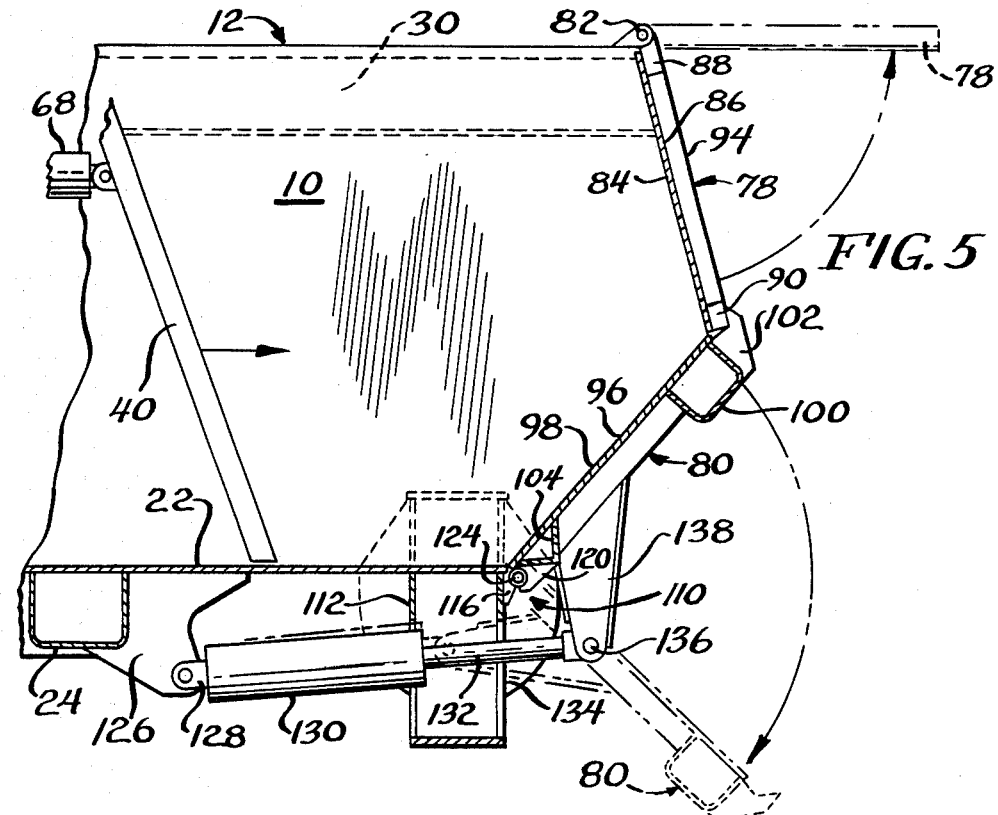
FIG. 5 is a fragmentary enlarged view of the rear portion of the wagon, taken partially in longitudinal section.
Figure 6:
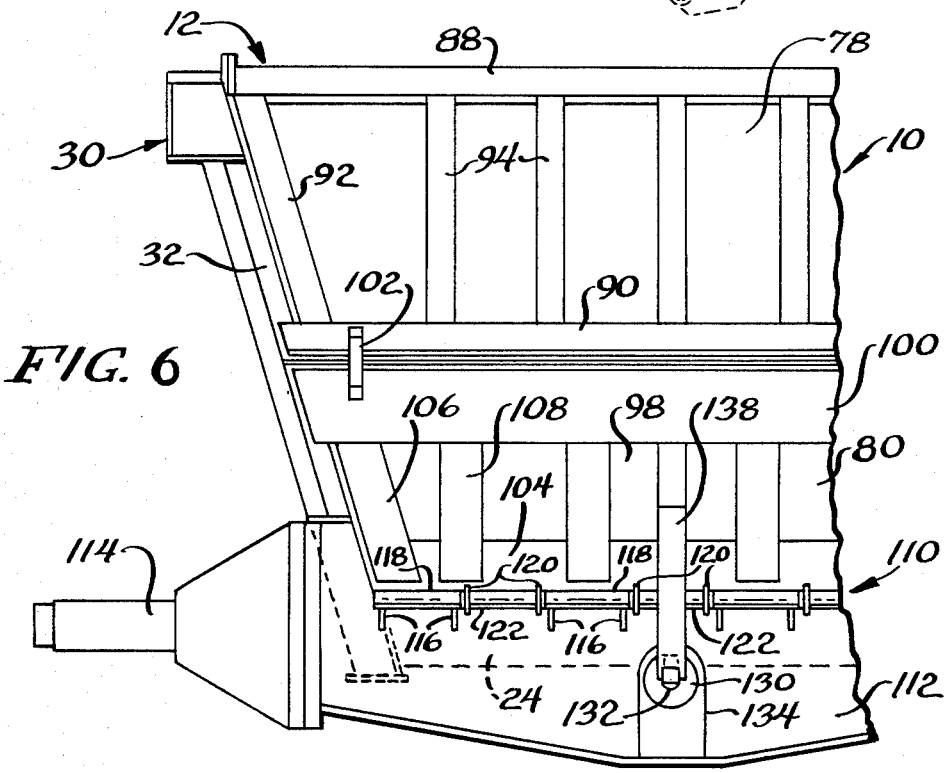
FIG. 6 is a fragmentary rear view of the wagon on an enlarged scale.

The wagon is closed at the back by a mud gate 78 and a tail gate 80 (FIGS. 1, 5 and 6). The mud gate is pivoted at its upper edge on a pair of ears 82 at the top corner of the wagon, and gravitationally closes against the upper edge portion 84 of the rear end of the wagon, which portion extends downwardly at an angle slightly from the vertical and rearwardly of the wagon. The mud gate is pushed up to the horizontal position shown in broken lines in FIG. 5 by the force of material ejected from the wagon during ejection.

The mud gate 78 comprises a steel plate 86 having an upper reinforcing frame member 88 along the upper edge, and a lower reinforcing frame member 90 along the lower edge, interconnected by angled side frame members 92. Vertical reinforcing bars 94 extend between the upper and lower frame members 88 and 90 for further strengthening of the mud gate.

The tail gate 80 comprises in part a flat steel plate 96 which presses against the edges 98 at the rear of the wagon. The tail gate is pivoted at the lower edge as will be set forth shortly hereinafter, and extends diagonally upward and to the rear from the floor 22 of the wagon. The tail gate is provided along the upper edge thereof with a rather large transverse box beam 100 which carries a pair of hooks 102 thereon. With the tail gate in the solid line closed position of FIGS. 5 and 6 the upper ends of the hooks 102 overlie the reinforcement 90 of the mud gate to hold the mud gate in closed position. The tail gate further is provided with a triangular reinforcing channel 104 along the lower edge, and with a pair of diagonal side supports 106 and intermediate vertical supports 108 extending from the triangular channel 104 to the box beam 100 to reinforce the steel plate 96.

The tail gate is hinged at its lower edge to the floor of the wagon as indicated at 110. A deep box beam 112 extends across the underside of the floor for mounting the axles 114 for the wheels 14. Pairs of spaced ears 116 are welded to the box beam 112, and have welded to them spaced sections of tubing 118. Similarly, there are pairs of spaced ears 120 welded to the triangular channel 104 and having spaced tubes 122 welded thereto. The tubes 118 and 122 alternate, and a hinge rod 124 extends through them, thus hingedly to support the tail gate from the box beam 112.

A mounting member 126 depends from the floor 22 and one of the cross beams 24 to which it is welded (FIG. 5) and has pivoted thereto the mount 128 at the end of the hydraulic cylinder 130 having a piston rod 132 extending therefrom. The cylinder and piston rod extend through an opening 134 in the box beam along the center line of the wagon. The far end of the piston rod is pivoted at 136 to a depending lever 138 welded to the central reinforcing member 108 of the tail gate.

With no material in the wagon the mud gate 78 readily drops to a closed position, and actuation of the hydraulic piston arrangement 130, 132 by controls in the tractor from a pressure source in the tractor causes the tail gate to close tightly and to clamp the mud gate closed. The wall 40 is moved to its forward position by means of the piston and cylinder arrangement 68. Material is then heaped into the wagon as indicated at 140 by means of a front end loader or the like, and can readily be piled up above the top of the wagon as shown. When it is desired to dump the material from the wagon, which usually is done with the wagon moving slowly forwardly, the tail gate is dropped to the broken line position shown in FIG. 5 by the hydraulic piston-cylinder arrangement 130. The front wall or ejector plate 40 is then pushed to the rear by the hydraulic cylinder-piston arrangement 68 to push the material from the wall down the tail gate on to the ground. Much of the material may readily be passed beneath the mud gate in closed position, but any that is obstructed by the mud gate simply causes the mud gate to swing open up to the horizontal position shown in broken lines in FIG. 5. After all or part of the material has been dumped, as may be desired, the wagon is returned to its original condition with the tail gate or mud gate closed, and with the front wall in its forward position.

The specific example of the invention as herein shown and described is for illustrative purposes only. Various changes in structure will no doubt occur to those skilled in the art and will be understood as forming a part of the present invention insofar as they fall within the spirit and scope of the appended claims.

The invention is claimed as follows:

1. An ejector wagon comprising a body having sidewalls and a floor, said sidewalls sloping upwardly and outwardly from said floor to upper edges and having substantially flat inner surfaces, said walls having horizontal rails adjacent said upper edges, a rear end having an openable closure, wheels rotatably mounted from said body for moving wagon over the ground or the like, a gooseneck extending forwardly from said wagon for attachment to a tractor, an ejector at the front of said body mounted transversely thereof for movement of said ejector from the front of said body toward the rear thereof, said ejector including a substantially upright plate inclined at a shallow angle to the vertical with the lower portion thereof being disposed rearwardly of the upper portion thereof, said plate having tapered side edges and conforming to the interior shape of said wagon body, hydraulic cylinder means mounted on said gooseneck and acting on said ejector for movement thereof, said gooseneck being otherwise free of hydraulic cylinder means, and a plurality of carriages connected to said ejector and riding on said rails for movably mounting said ejector, said hydraulic cylinder means being directly connected to and acting on said ejector plate above the horizontal center line thereof but substantially at the center of area of said plate.

2. An ejector wagon as set forth in claim 1 wherein said cylinder means comprises two cylinders mounted on opposite sides of said gooseneck and in close proximity thereto.

3. An ejector wagon set forth in claim 1 wherein said cylinder means comprises a single cylinder mounted at least in part within said gooseneck.

4. An ejector wagon as set forth in claim 1 wherein said rails are at the top edges of said sidewalls, said ejector plate having upper corners projecting outwardly above said rails, and said carriages are mounted on said corners and mounted on said rails.

5. An ejector wagon as set forth in claim 1 and further including upper and lower rear closure members, said upper rear closure member being pivoted adjacent its upper end and in rest position extending downwardly and rearwardly from said upper end, said lower closure member being pivoted adjacent its lower end and in rest position extending upwardly and rearwardly from said lower end, and hydraulic means operating said lower closure member and pivoting said lower member below horizontal position, said lower closure member at its upper edge abutting the lower edge of said upper closure member and having at its upper edge overlapping means cooperating with said upper closure member to hold said upper closure member in closed position when said lower closure member is hydraulically operated to closed position.

6. An ejector wagon as set forth in claim 5 wherein said upper closure member is gravitationally operated, and wherein the means on the lower closure member for holding the upper closure member in closed position comprises a plurality of projections on said lower closure member.

7. An ejector wagon as set forth in claim 6 wherein said projections comprise hook-like members.

* * * * *